United States Patent
Fleckenstein et al.

(10) Patent No.: US 9,758,329 B2
(45) Date of Patent: *Sep. 12, 2017

(54) AUTOMATIC HANDLING AND AERATION OF A STACK OF PAPER SHEETS

(71) Applicant: INDUSTRIAL ROBOT AUTOMATION, Espegaerde (DK)

(72) Inventors: Lars Fleckenstein, Helsinge (DK); Henrik Christiansen, Limhamm (SE)

(73) Assignee: INDUSTRIAL ROBOT AUTOMATION, Espegaerde (DK)

( * ) Notice: Subject to any disclaimer, the term of this patent is extended or adjusted under 35 U.S.C. 154(b) by 25 days.

This patent is subject to a terminal disclaimer.

(21) Appl. No.: 14/639,622

(22) Filed: Mar. 5, 2015

(65) Prior Publication Data

US 2015/0191323 A1 Jul. 9, 2015

Related U.S. Application Data

(62) Division of application No. 13/883,145, filed as application No. PCT/DK2011/050441 on Nov. 21, 2011, now Pat. No. 9,004,847.

(30) Foreign Application Priority Data

Nov. 22, 2010 (DK) .................. 2010 01055

(51) Int. Cl.
*B65H 3/62* (2006.01)
*B65H 3/00* (2006.01)
(Continued)

(52) U.S. Cl.
CPC .............. *B65H 7/20* (2013.01); *B25J 9/0087* (2013.01); *B65H 3/322* (2013.01); *B65H 3/36* (2013.01);
(Continued)

(58) Field of Classification Search
CPC ... B65H 3/62; B65H 3/00; B65H 3/50; B65H 3/60; B65H 2301/4227; B65H 2301/4228;
(Continued)

(56) References Cited

U.S. PATENT DOCUMENTS 4,922,782 A  5/1990  Kawal
5,017,085 A  5/1991  Ishikawa
(Continued)

FOREIGN PATENT DOCUMENTS

| DE | 26 49 959 | | 5/1978 | |
|---|---|---|---|---|
| DE | 2649959 | A1 * | 5/1978 | ............ B65H 3/322 |
| DE | 27 23 162 | | 11/1978 | |
| DE | 2723162 | A1 * | 11/1978 | ............ B65H 3/322 |
| DE | EP 0098385 | A1 * | 1/1984 | ............ B65H 3/322 |
| DE | EP 1598293 | A1 * | 11/2005 | ............ B65H 3/322 |
| DE | EP 2128056 | A1 * | 12/2009 | ............ B65H 3/32 |
| EP | 0 098 385 | | 1/1984 | |
| EP | 0 732 282 | | 9/1996 | |
| EP | 1 598 293 | | 11/2005 | |
| EP | 2 128 056 | | 12/2009 | |
| JP | 60-48848 | | 3/1985 | |
| JP | 60048848 | A * | 3/1985 | |
| JP | 62-8936 | | 1/1987 | |
| JP | 62-8937 | | 1/1987 | |
| JP | 62008936 | A * | 1/1987 | |

(Continued)

OTHER PUBLICATIONS

International Search Report from International Application No. PCT/DK2011/050441 dated Feb. 22, 2012.

*Primary Examiner* — Gregory Adams
(74) *Attorney, Agent, or Firm* — Merchant & Gould P.C.

(57) ABSTRACT

A method and apparatus for automated aerating and handling a sub stack of a stack of rectangular paper sheets where the sub stack is gripped near or at opposed corners of a common edge of the sub stack by means of two robotic grippers (A, B) having two opposed gripping fingers (A1, A2, B1, B2), lifting and rotating the corners in mutually opposite first directions such that the work stack achieves an upwards concave form, gripping the corners by the robotic grippers (A, B), and rotating the grippers in second directions opposite to the first directions such that the upper sheet of the sub stack has a curvature smaller than the bottom sheet of the sub stack, preferably a substantially plane form.

11 Claims, 6 Drawing Sheets

(51) Int. Cl.
  *B65H 7/20* (2006.01)
  *B65H 3/32* (2006.01)
  *B25J 9/00* (2006.01)
  *B65H 3/50* (2006.01)
  *B65H 3/60* (2006.01)
  *B65H 5/00* (2006.01)
  *B65H 5/14* (2006.01)
  *B65H 3/36* (2006.01)

(52) U.S. Cl.
  CPC ............... *B65H 3/50* (2013.01); *B65H 3/60* (2013.01); *B65H 5/006* (2013.01); *B65H 5/14* (2013.01); *B65H 2301/4227* (2013.01); *B65H 2301/4228* (2013.01); *B65H 2301/42242* (2013.01); *B65H 2555/31* (2013.01); *Y10S 901/31* (2013.01)

(58) Field of Classification Search
  CPC .......... B65H 3/24; B65H 3/32; B65H 3/5284; B65H 3/66
  USPC ............... 156/705, 754, 761, 764; 271/161; 414/795.9, 796, 796.2, 796.5, 796.6, 414/796.9, 799; 901/8
  See application file for complete search history.

(56) References Cited

U.S. PATENT DOCUMENTS

| | | |
|---|---|---|
| 5,096,370 A | 3/1992 | Mohr |
| 5,657,618 A | 8/1997 | Dall'Omo et al. |
| 5,811,951 A | 9/1998 | Young |
| 7,832,978 B2 | 11/2010 | Benuzzi |
| 9,004,847 B2 * | 4/2015 | Fleckenstein ......... B25J 9/0087 271/161 |
| 2008/0267757 A1 | 10/2008 | Benuzzi |

FOREIGN PATENT DOCUMENTS

| | | | |
|---|---|---|---|
| JP | 62008937 A * | 1/1987 | |
| SE | EP 0732282 A2 * | 9/1996 | ............... B65H 3/60 |

* cited by examiner

AUTOMATIC HANDLING AND AERATION OF A STACK OF PAPER SHEETS

CROSS REFERENCE TO RELATED APPLICATIONS

This application is a Divisional of U.S. Ser. No. 13/883,145, filed 2 May 2013, which is a National Stage Application of PCT/DK2011/050441, filed 21 Nov. 2011, which claims benefit of Serial No. PA 2010 01055, filed 22 Nov. 2010 in Denmark and which applications are incorporated herein by reference. To the extent appropriate, a claim of priority is made to each of the above disclosed applications.

FIELD OF THE DISCLOSURE

The present invention relates to a method of handling and aerating a work stack of rectangular paper sheets in connection with use of the paper sheets in a printing facility.

BACKGROUND

In the printing industry small stacks or work stacks, of paper sheets (e.g. 2-15 cm high) are separated and removed from a large or basic stack (e.g. 100 cm high) for future processing, for instance aligning, cutting, folding or printing.

During these future processing steps it is important that each sheet should be able to be separated from the rest of the sheets individually. To achieve this, introduction of air (airing) between the individual sheets is essential to avoid that neighbouring sheets "stick" together.

The basic airing process is to bend the small stack of paper sheets, the work stack, in such a way that the curvature of the stack is larger at the bottom side than at the top side, and hence a space is formed between all neighbouring sheets into which air is sucked whereby the tendency of neighbouring sheets to stick together is eliminated.

Now the work stack can be carried over to an aligning device, typically a shaking box or vibration table, where the sheet edges can be aligned because of the aeration of the work stack.

This is very labour intensive and potentially harmful to the person performing the lifting and flexing actions manually. Attempts have been made to automate this aeration process with unsatisfactory results.

Therefore, a main object of the invention is to automate the process in a more satisfactory manner so that the manual labour can be replaced by mechanical means.

BRIEF SUMMARY

According to the invention, this object is achieved by:
providing an automated device comprising first and second gripping devices each provided with first and second mutually opposed fingers adapted to move towards and away from one another so as to be able to grip and release said work stack between them, each gripping device being adapted for having at least four degrees of freedom, preferably five degrees of freedom and most preferably six degrees of freedom,
inserting said first finger of said first gripping device below the bottom sheet of said work stack and placing it at or near a first corner of said work stack and inserting said first finger of said second gripping device below said bottom sheet and placing it at or near a second corner of said work stack, said first and second corners being located on the same edge of said work stack,
lifting and rotating said first and second corners of said work stack by lifting said first and second gripping devices and rotating said first and second gripping devices in first, mutually generally opposed directions such that the portion of said work stack located between the two gripping devices forms an upwards concave body,
gripping said work stack by moving said second fingers into contact with the top sheet of said work stack, and
rotating said first and second gripping devices in second directions generally opposed to said first directions such that said top sheet is stretched between said gripping devices to achieve a form that is less upward concave than the form of said bottom sheet and preferably to achieve a generally plane form of said top sheet.

Hereby, the sheets of paper in the work stack are aerated effectively without any manual labour being involved.

DETAILED DESCRIPTION

According to the invention, said first and second fingers, during lifting and rotation, extend at angles between 0 and 90 degrees relative to said edge of the work stack, preferably between 10 and 80 degrees, more preferably between 30 and 60 degree, even more preferably between 40 and 50 degrees and most preferably between 44 and 46 degrees.

Hereby it is attained that neighbouring sheets are displaced horizontally relative to one another both parallel and at right angles to said edge which also is of importance in preventing sheets from sticking to one another.

Advantageously, said gripping devices may grip said work stack at points located between 0 and 50 cm from the respective said corner, preferably between 0 and 30 cm, more preferably between 0 and 10 cm and most preferably between 0 and 5 cm.

According to the invention, said work stack may comprise a top portion of paper sheets of a basic stack of paper sheets and said first finger of said first gripping device has a sharp leading edge to allow insertion thereof into said basic stack without damaging the edges of the paper sheets, the method comprising the steps of:
inserting said first finger of said first gripping device into said basic stack such that a gap is created between the bottom paper sheet of the thus defined work stack and the top sheet of the rest of the basic stack,
inserting said first finger of said second gripping device into said gap, and
moving said first finger of said second gripping device away from said first finger of said first gripping device towards said second corner such that both said first fingers abut said bottom sheet.

Hereby the separation of the work stack from the basic stack takes place without damaging the edge of the sheets and that both fingers abut the same, bottom, sheet of the work stack.

In a second aspect, the invention relates to an automated device for carrying out the method according to the invention.

According to the invention, each of said gripping devices is mounted on a manipulator arm having at least four degrees of freedom, preferably five degrees of freedom and most preferably six degrees of freedom.

Hereby, the necessary motions of the griping devices can be achieved for good aeration of the paper sheets in the work stack.

In a currently preferred embodiment of the invention said automated device comprises control means for controlling said manipulator arms independently of one another.

Such a two-armed robot is believed to be the most efficient means to carry out the method according to the invention.

According to the invention, each of said manipulator arms has at least one rotatable joint, preferably two rotatable joints, more preferably three rotatable joints and most preferably four rotatable joints such that at least one of said degrees of freedom of said first and second gripping devices are provided by said rotatable arm joints, and each of said manipulator arms is provided with at least one rotation actuator and optionally at least one linear actuator.

In a third aspect, the invention relates to a system for aligning and aerating a work stack of rectangular paper sheets comprising a stack of paper sheets, an automated device as specified above and an inclined vibration table for receiving said work stack for alignment of said paper sheets after the method specified above has been carried out.

In a final aspect, the invention relates to the use of an automated device having two independently controlled manipulator arms for carrying out the method specified above.

In the following, the invention will be explained more in detail with reference to the accompanying drawings that illustrate, solely by way of example, embodiments of the invention.

DETAILED DESCRIPTION

The invention will be described in the following with reference to FIGS. 1-12.

The "left" gripping device or gripper has a lower finger with a sharp edge to allow insertion thereof between sheets of paper in the large stack (see FIG. 2) without damaging the sheets. The "right" gripper has a lower finger with a cylindrically shaped projection to allow movement between the sheets without damaging the sheets as explained below.

To perform the separation of the work stack from the main stack and the aeration of the work stack as well as delivery of the work stack to the aligning device, a.k.a. as the shaker box or the vibration table, in a satisfactory manner, the grippers should have at least four degrees of freedom, preferably five degrees of freedom and most preferably six degrees of freedom. The degrees of freedom of each gripping device should preferably be independent of the degrees of freedom of the other gripping device.

Figure 11:
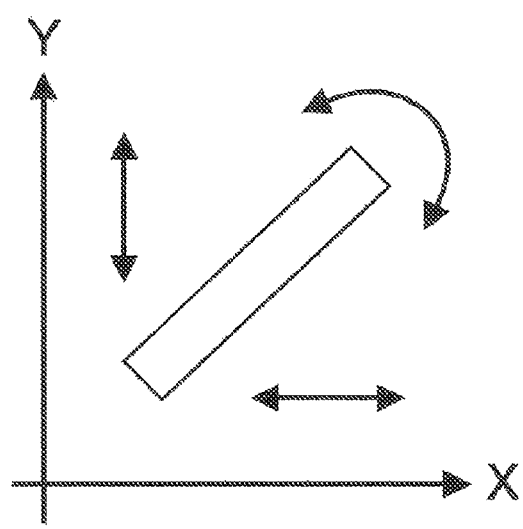
FIGS. 11-12 illustrate the definition of Degrees of Freedom of a rigid body.
Figure 12:
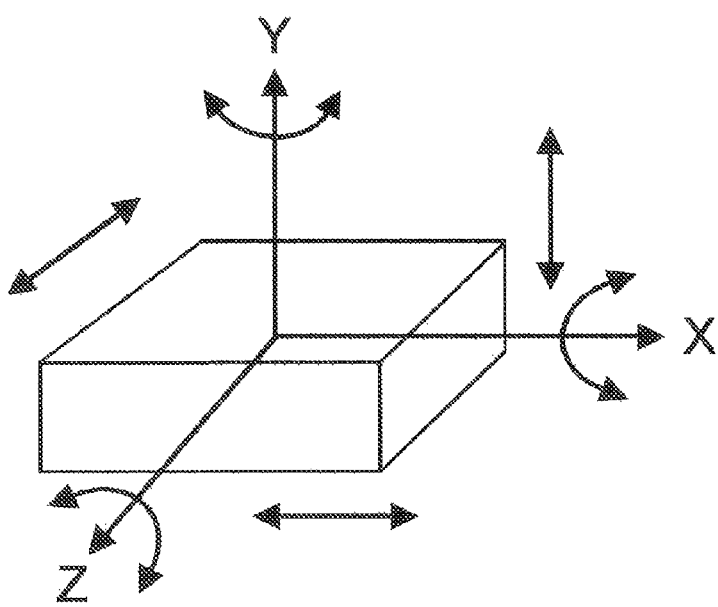

In the context of this patent application degrees of freedom are defined in relation to a three dimensional coordinate system with X, Y and Z axes as indicated in FIGS. 11 and 12. The first three degrees of freedom are movements parallel to the three axes, and the other three degrees of freedom are rotation around each of the three axes.

Furthermore, in the context of this patent application, the term paper sheet is to be understood to cover any sheet of printable material be it of paper, plastic, cardboard, laminated paper and so on.

The steps to be taken by the two-armed robot are described below with reference to FIGS. 2-8:

1) Move the lower finger A1 of the "left" gripper close to the left front corner of the basic stack of sheets
2) Move this lower finger upwards and inwards into the basic stack (FIG. 2) to separate the smaller work stack from the larger stack of paper sheets to create a gap to separate the work stack from the larger stack by inserting the sharp edge between two neighbouring sheets of paper. This upper sheet collection is the small work stack of sheets to be manipulated.
3) Place a rounded projection B3 (see FIG. 10) of the lower finger B1 of the "right" gripper in the gap between the lifted work stack and the remaining stack (FIG. 3). Move this finger sideways in the gap (FIG. 4) until the right foremost corner is reached (FIG. 5) with the rounded projection gliding along the sheets forming the gap without damaging them. This ensures that both grippers work on the same collection of sheets.
4) Leave the grippers at the two opposed corners of the work stack in a position as described more in detail below.
5) Lift them both and rotate the left one clockwise and the right one counter-clockwise (FIG. 6) so that the work stack is forced into an upwardly concave shape.
6) Close the upper fingers A2 and B2, respectively, towards the lower fingers A1 and B1, respectively, of the two grippers so that the two grippers now hold the work stack in the upwardly concave shape by applying pressure on the top and bottom sheets of the work stack (FIG. 7).
7) The left and right grippers A and B are now rotated counter-clockwise and clockwise, respectively, (FIG. 8), so that the upper sheet of the work stack is stretched out to a substantially plane form while the lower sheet still forms an upwardly concave shape. This movement will force the separation of the sheets of paper. Air will be sucked in between the sheets to help with the separation. In addition air can be blown into the gaps between the sheets.
8) The gripped work stack is now properly aired and is moved for further processing to a not shown shaker box or vibration table for alignment.

The grabbing and aerating of the paper sheets are illustrated graphically in the FIGS. 1-10.

Figure 1:
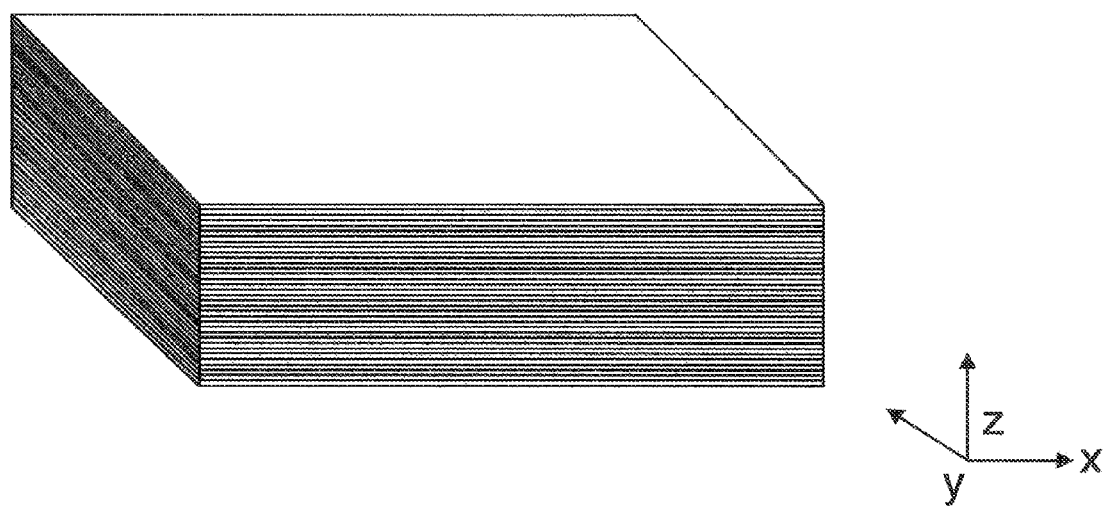
FIG. 1 is a schematic perspective view of a basic or original stack of sheets of paper.

Referring Now to FIG. 1:

The original stack of paper sheets illustrates a stack of papers from which a smaller work stack which has to be moved is to be separated. The coordinate system to the right defines the orientation and position of the stack and is used to describe the movements of the tools, the grippers of the robot.

Figure 2:
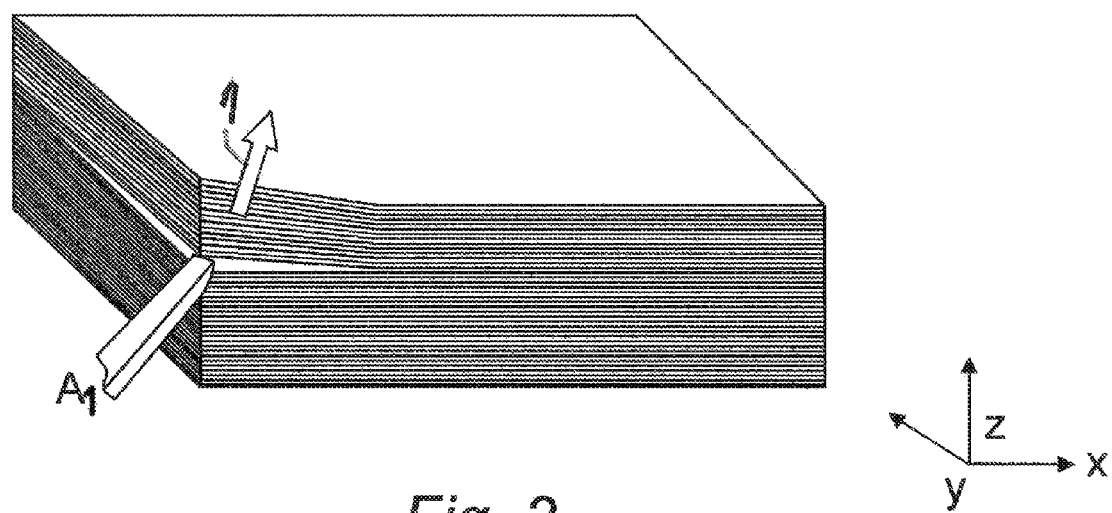
FIGS. 2-5 show the method of inserting the two lower gripping device fingers and placing them in their respective positions near the corners of the work stack.
Figure 3:
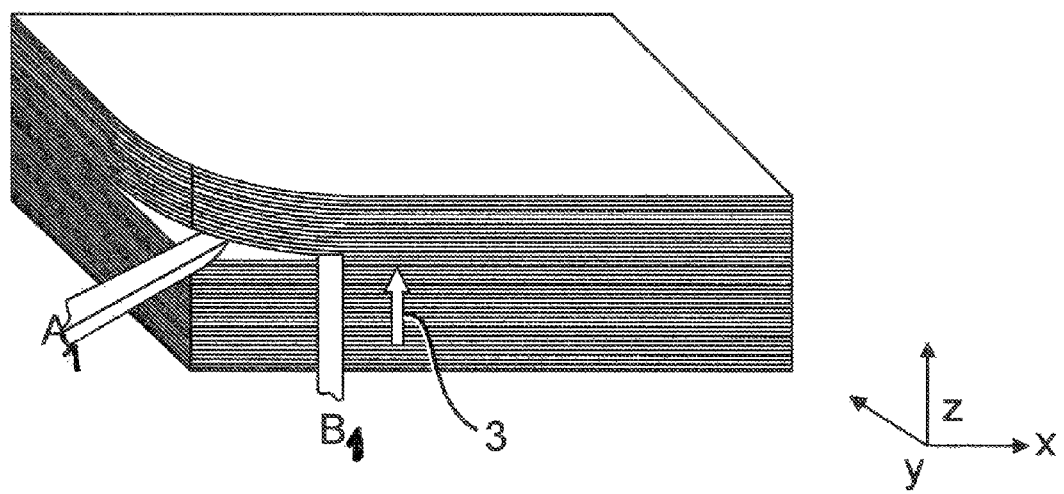

Referring Now to FIG. 2:

Step 1: Move the lower, sharp edged finger A1 of the left gripper into the vicinity of the corner of the large stack of papers.

Step 2: Move the lower finger A1 in an upwards and inwards direction in the direction of the arrow 1, (e.g. with a direction vector ((x,y,z) (1,1,4) in the coordinate system in FIG. 2, i.e. utilizing the three degrees of freedom along the three axes) from the start position at the left foremost corner achieved during step 1.

The upward and inward motion of the lower finger A1 enters the stack between two sheets of paper, and creates a gap to select the work stack of sheets. The finger used for this is shaped with a sharp edge at its end, and has edges that are rounded (not shown) to protect the sheets.

It should be noted that although the lower finger A of the left gripper is shown as inserted at the front left corner of the stack, it could also be inserted perpendicularly to the front edge of the stack (parallel to the Y axis) or perpendicularly to the left edge of the stack (parallel to the X-axis) as long as the insertion point is near the corner for creating the gap for inserting the lower finger B1 of the right gripper as described below.

FIG. 1 Illustrates the insertion of the right gripper's lower finger B1.

The lower finger B1 of the right gripper is moved perpendicularly to the edge of the stack into the gap created by step 2. The lower finger B1 having a cylindrical or rounded projection B3 (see FIG. 10) is inserted next to the lower finger A1. This movement is indicated by the arrow 3 and is in the y direction.

Figure 4:
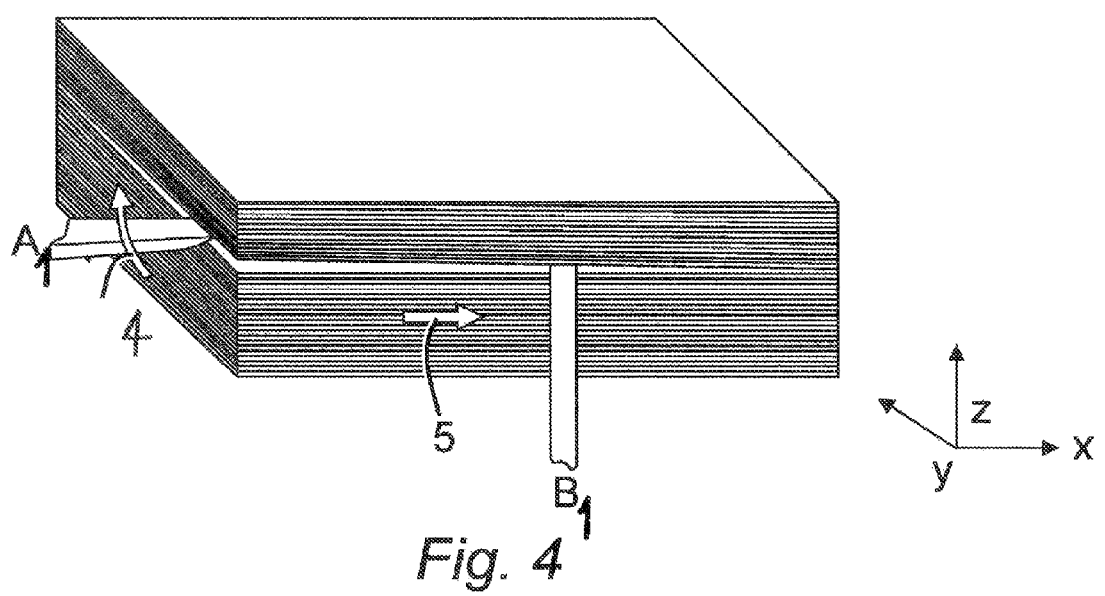

Referring Now to FIG. 4:

The lower finger B1 is moved along the edge in the gap to separate the bottom sheet of the work stack from the top sheet of the remaining stack. This movement stops before the right corner of the stack. This move is indicated with the arrow 5 and is in the X direction.

The finger A1 is shown moved in the direction of arrow 4 so that it is generally parallel to the x axis.

Figure 5:
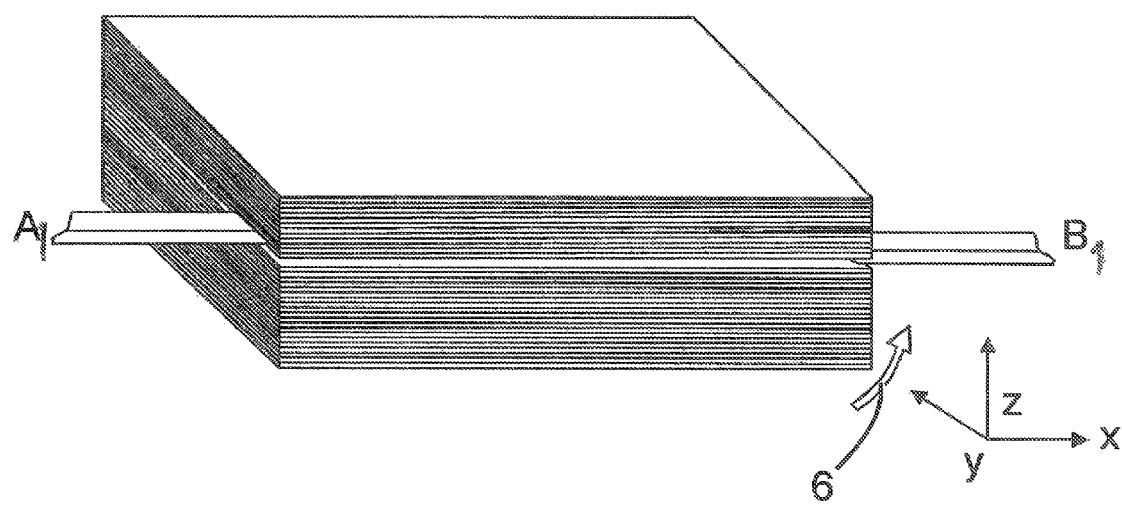

Referring Now to FIG. 5:

The rotation of finger B1 is around the z axis, and is shown around 90 degrees so that it also is substantially parallel with the x axis. The rotation is indicated by the arrow 6.

Figure 6:
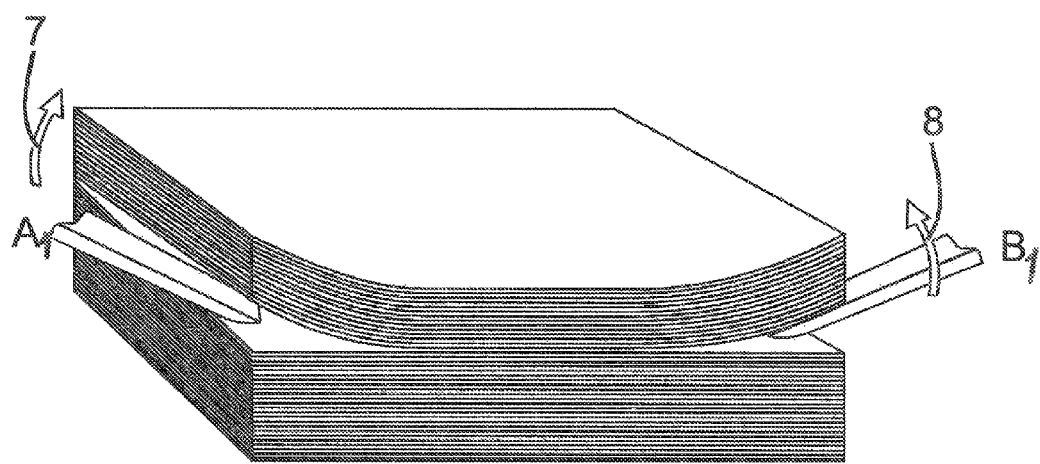
FIG. 6 shows the lifting of the corners of the work stack.
Figure 7:
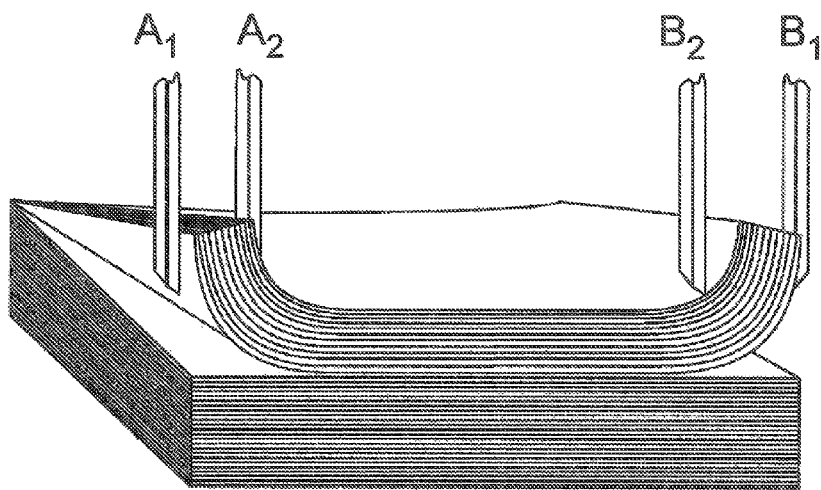
FIG. 7 shows the gripping of the corners of the work stack.

Referring Now to FIG. 6:

The lifting and rotation of the fingers A1 and B1 is indicated by arrows 7 and 8, respectively. The movement is continued until the paper is positioned as illustrated in FIG. 7. Hereby a shifting of the relative positions of the sheets of paper in the stack is achieved and allows the sheets to be able to suck air between them, before the grippers are closed by moving the upper fingers of each gripper into contact with the uppermost sheet of the work stack.

Referring Now to FIG. 7:

After the rotation and lifting of the lower fingers A1 and B1 of the grippers, both grippers are closed by moving fingers A2 and B2 towards finger A1 and B1, respectively such that the work stack is firmly grasped by both grippers.

Figure 8:
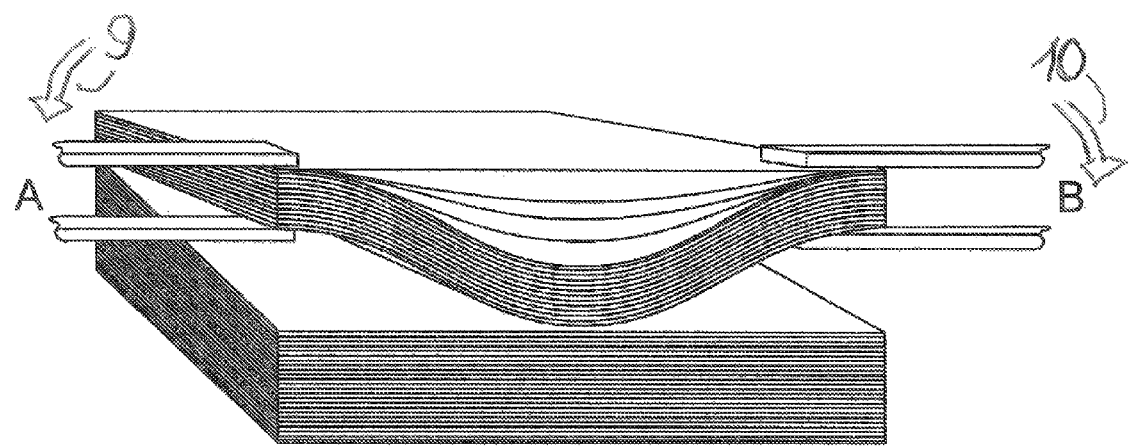
FIG. 8 shows the "outward" rotation of the gripping devices with the resulting separation and aeration of the sheets.

It should be pointed out that although the position of the fingers A1 and B1 is shown in FIGS. 5-7 as being parallel with the X-axis, it is currently considered best that fingers extend at an angle to the X-axis (preferably tending towards the direction (XYZ) (−2,2,0)) because this will entail relative displacement of neighbouring sheets in the direction of both the X-axis and the Y-axis before the grippers are closed to abut both the top and bottom sheet of the work sheet as shown in FIGS. 7 and 8.

Referring Now to FIG. 8:

When the grippers A and B are rotated back "outwards" in the direction of the arrows 9 and 10, i.e. gripper A counter-clockwise and gripper B clockwise, while holding the paper stack firmly, the stack is further aerated because when bending the work stack of paper sheets in such a way that the curvature of each sheet is larger on the outside than the inside air is sucked in between all neighbouring sheets. The rotation of the grippers may be repeated one or more times.

Figure 9:
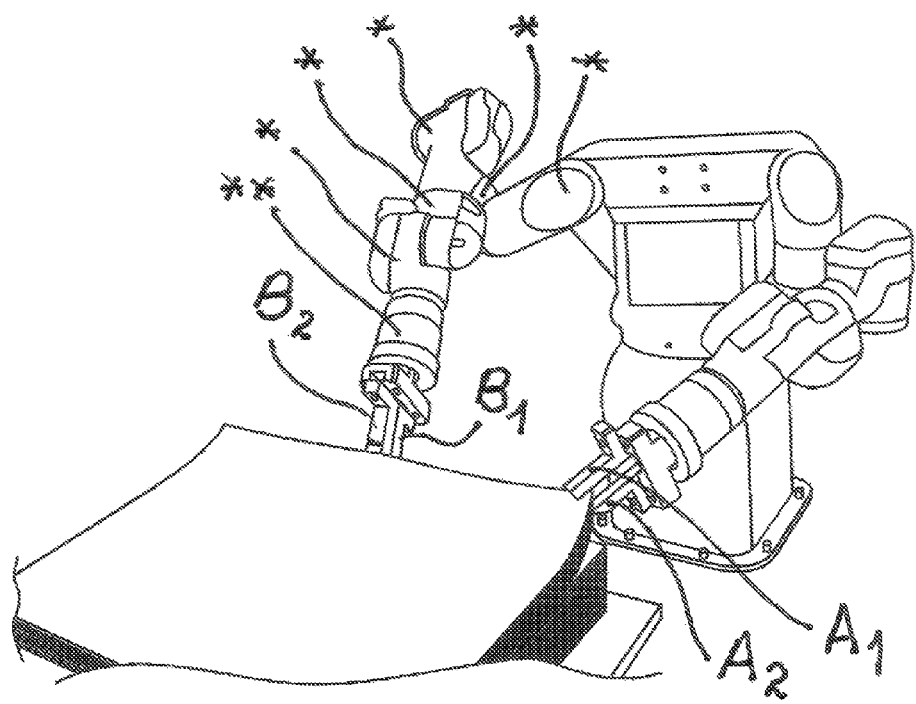
FIG. 9 is a schematic perspective view of a two-armed robot according to the invention inserting the two gripping devices at the bottom of the work stack.
Figure 10:
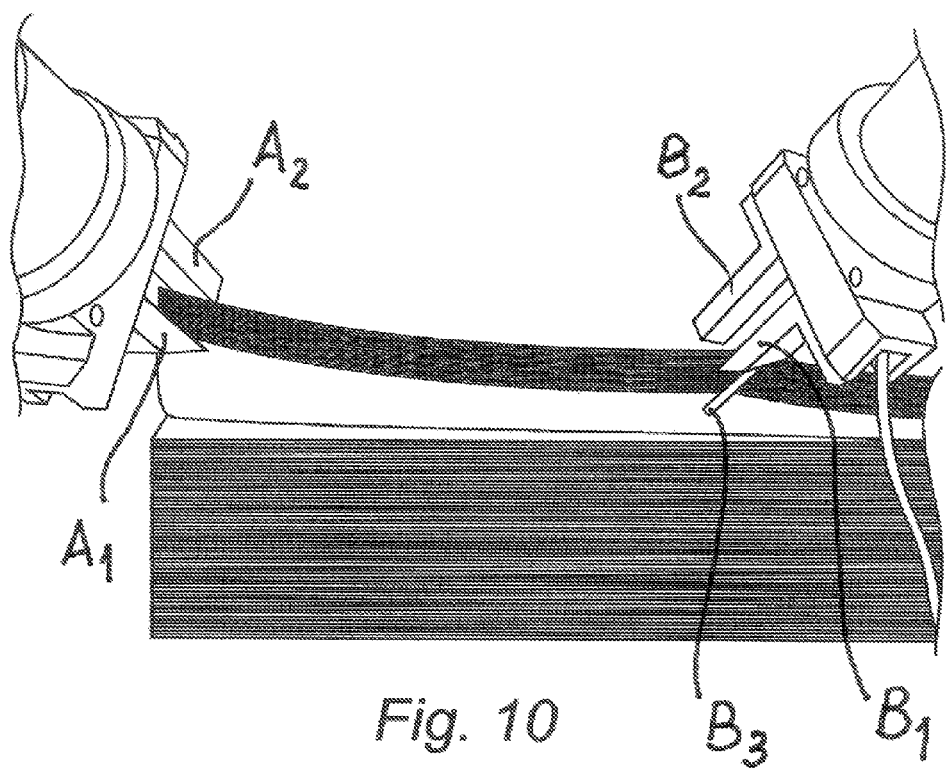
FIG. 10 is a view of the same situation as FIG. 8 seen in the opposite direction and in enlarges scale.

Referring Now to FIGS. 9 and 10:

The Figures show a two-armed robot installation for separating, handling and aerating a work stack of paper sheets. Each arm has six rotary joints with corresponding rotary actuators, where five of these joints indicated by the symbol (*) are joints having an axis of rotation perpendicular to the longitudinal extent of the adjacent arm element while one of the joints indicated by the symbol (**) has an axis of rotation parallel to said longitudinal extent.

Further rotary joints with rotary actuators as well as telescopic elements with linear actuators can be incorporated for allowing further flexibility in the aerating manipulation of the work stack.

Some of the desired effect can be achieved by the grippers A and B gripping the work stack at different locations on the same edge of the work stack but by far the best results are obtained if the two grippers grip the work stack near or at two corners of the stack located on the same edge of the stack as illustrated in FIGS. 7 and 8 (the front edge viewed from the robot).

The invention claimed is:

1. A method of handling and aerating a work stack of rectangular paper sheets in connection with use of the paper sheets in a printing facility, the method comprising the steps of:

providing an automated device comprising first and second gripping devices each provided with first and second mutually opposed fingers adapted to move towards and away from one another so as to be able to grip and release said work stack between them, each gripping device being adapted for having at least four degrees of freedom, preferably five degrees of freedom and most preferably six degrees of freedom, inserting said first finger of said first gripping device below the bottom sheet of said work stack and placing it at or near a first corner of said work stack and inserting said first finger of said second gripping device below said bottom sheet and placing it at or near a second corner of said work stack, said first and second corners being located on the same edge of said work stack, lifting and rotating said first and second corners of said work stack by lifting said first and second gripping devices and rotating said first and second gripping devices in first, mutually generally opposed directions such that the portion of said work stack located between the two gripping devices forms an upwards concave body, gripping said work stack by moving said second fingers into contact with the top sheet of said work stack, and rotating said first and second gripping devices in second directions generally opposed to said first directions such that said top sheet is stretched between said gripping devices to achieve a form that is less upward concave than the form of said bottom sheet and preferably to achieve a generally plane form.

2. A method according to claim 1, wherein said first and second fingers, during lifting and rotation extend at angles between 0 and 90 degrees relative to said edge of the work stack, preferably between 10 and 80 degrees, more preferably between 30 and 60 degree, even more preferably between 40 and 50 degrees and most preferably between 44 and 46 degrees.

3. A method according to claim 1, wherein said gripping devices grip said work stack at points located between 0 and 50 cm from the respective said corner, preferably between 0 and 30 cm, more preferably between 0 and 10 cm and most preferably between 0 and 5 cm.

4. A method according to claim 1, wherein said work stack comprises a top portion of paper sheets of a basic stack of paper sheets and said first finger of said first gripping device has a sharp leading edge to allow insertion thereof into said basic stack without damaging the edges of the paper sheets, the method comprising the steps of:
- inserting said first finger of said first gripping device into said basic stack such that a gap is created between the bottom paper sheet of the thus defined work stack and the top sheet of the rest of the basic stack,
- inserting said first finger of said second gripping device into said gap, and
- moving said first finger of said second gripping device away from said first finger of said first gripping device towards said second corner such that both said first fingers abut said bottom sheet.

5. An automated device for carrying out the method according to claim 1.

6. An automated device according to claim 5, wherein each of said gripping devices is mounted on a manipulator arm having at least four degrees of freedom, preferably five degrees of freedom and most preferably six degrees of freedom.

7. An automated device according to claim 6 comprising control means for controlling said manipulator arms independently of one another.

8. An automated device according to claim 6, wherein each of said manipulator arms has at least one rotatable joint, preferably two rotatable joints, more preferably three rotatable joints and most preferably four rotatable joints such that at least one of said degrees of freedom of said first and second gripping devices are provided by said rotatable arm joints.

9. An automated device according to claim 6, wherein each of said manipulator arms is provided with at least one rotation actuator and optionally at least one linear actuator.

10. A system for aligning and aerating a work stack of rectangular paper sheets comprising a stack of paper sheets, an automated device according to claim 5 and an inclined vibration table for receiving said work stack for alignment of said paper sheets.

11. Use of an automated device having two independently controlled manipulator arms for carrying out the method according to claim 1.

* * * * *